March 6, 1956

G. W. LINDSAY 2,737,401

FUEL SERVICING NOZZLE

Filed Jan. 26, 1953

INVENTOR.
GRIFFITH W. LINDSAY
BY
ATTORNEYS

March 6, 1956 — G. W. LINDSAY — 2,737,401
FUEL SERVICING NOZZLE
Filed Jan. 26, 1953 — 6 Sheets-Sheet 3

INVENTOR.
GRIFFITH W. LINDSAY
BY Toulmin & Toulmin
ATTORNEYS

March 6, 1956
G. W. LINDSAY
2,737,401
FUEL SERVICING NOZZLE
Filed Jan. 26, 1953
6 Sheets-Sheet 4
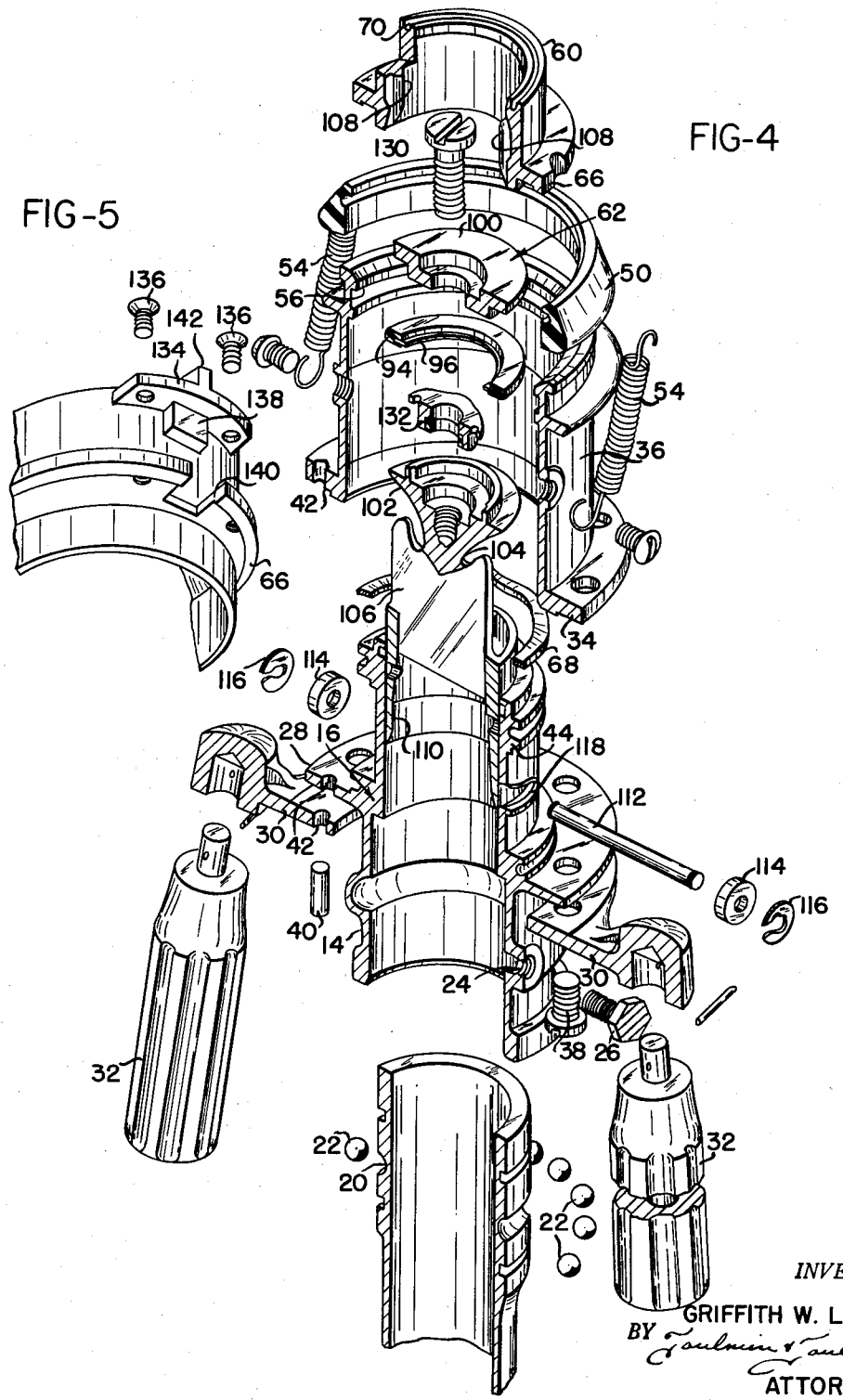
INVENTOR.
GRIFFITH W. LINDSAY
BY *Toulmin & Toulmin*
ATTORNEYS March 6, 1956 G. W. LINDSAY 2,737,401
FUEL SERVICING NOZZLE
Filed Jan. 26, 1953 6 Sheets-Sheet 5

INVENTOR.
GRIFFITH W. LINDSAY
BY Toulmin & Toulmin
ATTORNEYS

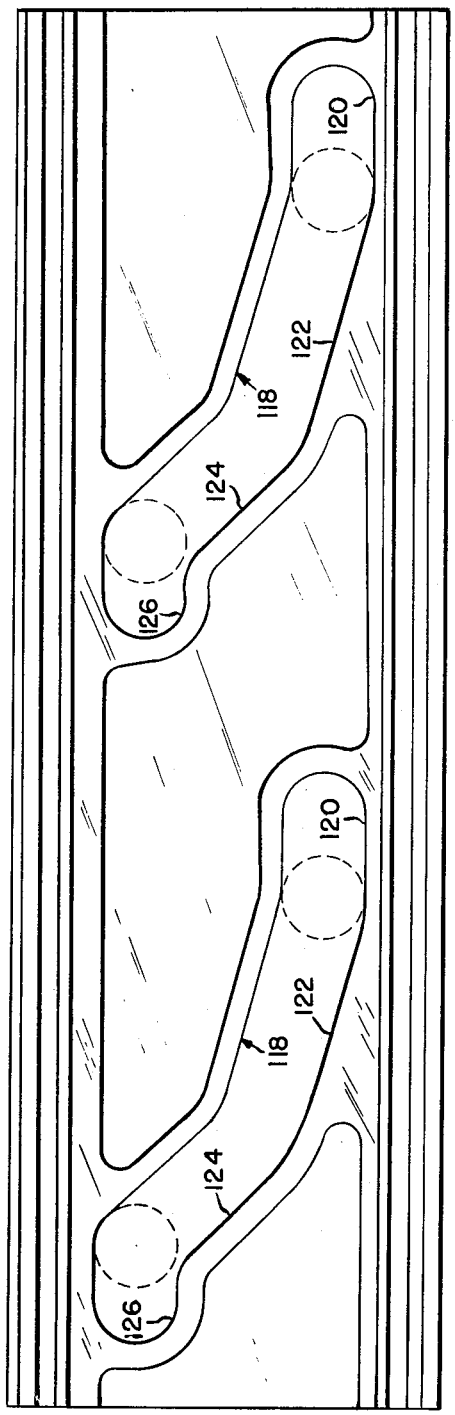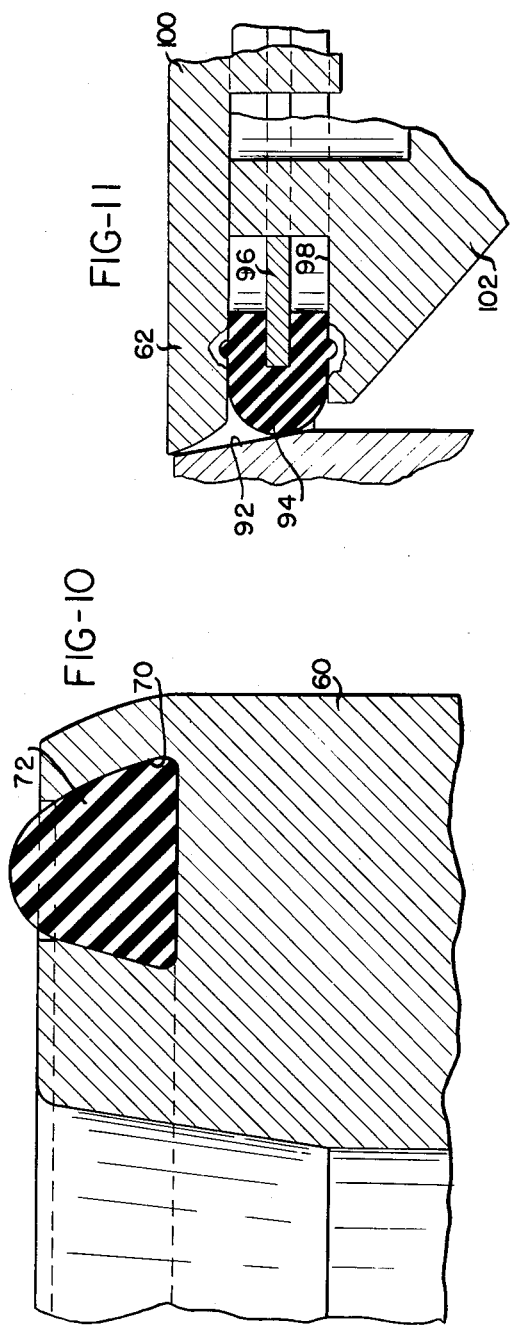

United States Patent Office 2,737,401
Patented Mar. 6, 1956

2,737,401

FUEL SERVICING NOZZLE

Griffith W. Lindsay, Dayton, Ohio, assignor to Buckeye Iron & Brass Works, Dayton, Ohio, a corporation of Ohio Application January 26, 1953, Serial No. 333,041

3 Claims. (Cl. 284—18)

This invention relates to fuel nozzles, and particularly to fuel nozzles of the type that are and will be employed for supplying fuel to relatively large storage and supply tanks such as those in tank trucks, aircraft, diesel locomotives, power boats, and the like.

Most aircraft are provided with fuel tanks having adapter fittings to which a fuel nozzle can be connected for quickly supplying fuel to the said tanks. Among the problems that have been encountered previously in connection with nozzles of this nature is the lack of standardization of the nozzles and adapters, the ineffectiveness of the seals between the nozzles and adapters, the difficulty of making the connection of the nozzle to the adapter, and the loss of pressure of the fuel flowing through the nozzle.

Having the foregoing in mind, it is a primary object of this invention to provide a fuel nozzle of the nature referred to in which the said drawbacks and difficulties are eliminated.

A particular object is the provision of an improved fuel nozzle of the nature referred to which can quickly be connected with the adapter, for example, the wing of an aircraft to be serviced for supplying fuel to the fuel tank of the aircraft.

Another object of this invention is the provision of an improved sealing means by which the nozzle seals against the adapter fitting on the aircraft and automatically adjusts itself to dimensional variations of this fitting, thereby preventing any leakage between the nozzle and the adapter.

A still further object is the provision of a fuel nozzle having flow passage therethrough so designed that a minimum loss of pressure obtains during the passage of fuel therethrough, whereby the filling of the fuel tank of the aircraft can be accomplished in the shortest possible time and with a minimum amount of pressure, and with there being a minimum of turbulence set up in the fuel.

A still further object of this invention is the provision of a fuel nozzle of the nature referred to which connects with an adapter fitting with a cam action in which an indicator is provided that indicates the position of the valve member in the nozzle so that it can readily be attached to the adapter at any time.

Another object of this invention is the provision of a construction for the fuel nozzle so that the several parts thereof can be assembled in proper relation quite readily so that at any time it becomes necessary the nozzle can be dismantled for repairing or cleaning and then be re-assembled and immediately placed in service.

These and other objects and advantages of this invention will become more apparent upon reference to the following specification taken in connection with the accompanying drawings, in which:

Figure 4 is an exploded perspective view showing the construction of the nozzle;

Figure 5 is a fragmentary view showing another detail of construction concerning the manner in which the nozzle is oriented relative to the adapter when they are connected together;

Figure 9 is a developed view indicated by line 9—9 on Figure 7 showing in more detail the cam track that is also illustrated in Figures 3 and 6;

Figure 10 is an enlarged view showing the manner in which a sealing ring is provided at the upper end of the fuel nozzle for effecting sealing engagement of the nozzle with the adapter; and Figure 11 is an enlarged view showing the manner in which the valve member of the nozzle is provided with an annular seal for engagement with the valve seat in the end of the nozzle.

Figure 1:
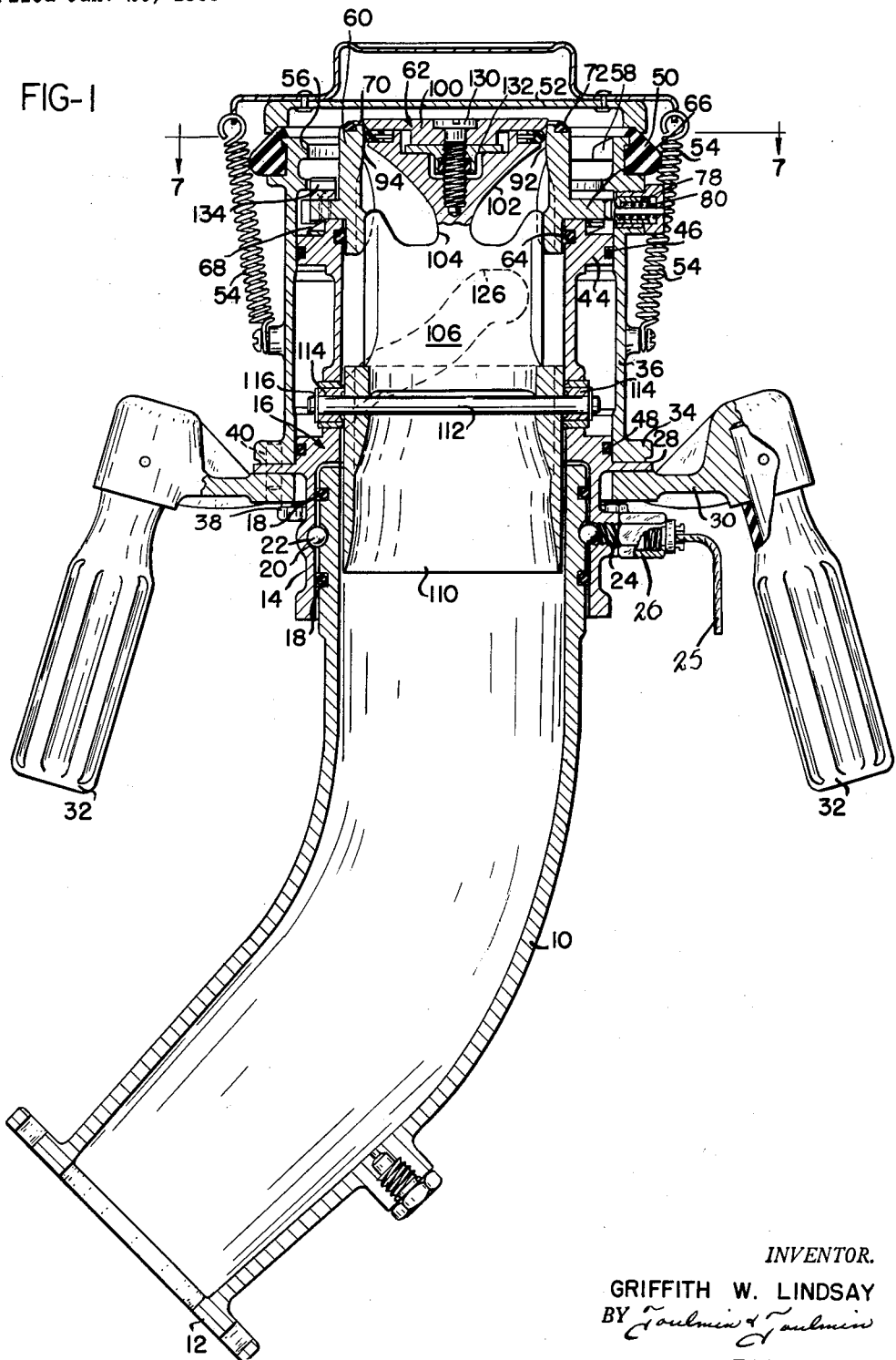
Figure 1 is a vertical sectional view through the fuel nozzle according to this invention showing the valve member of the nozzle in closed position.
Figure 3:
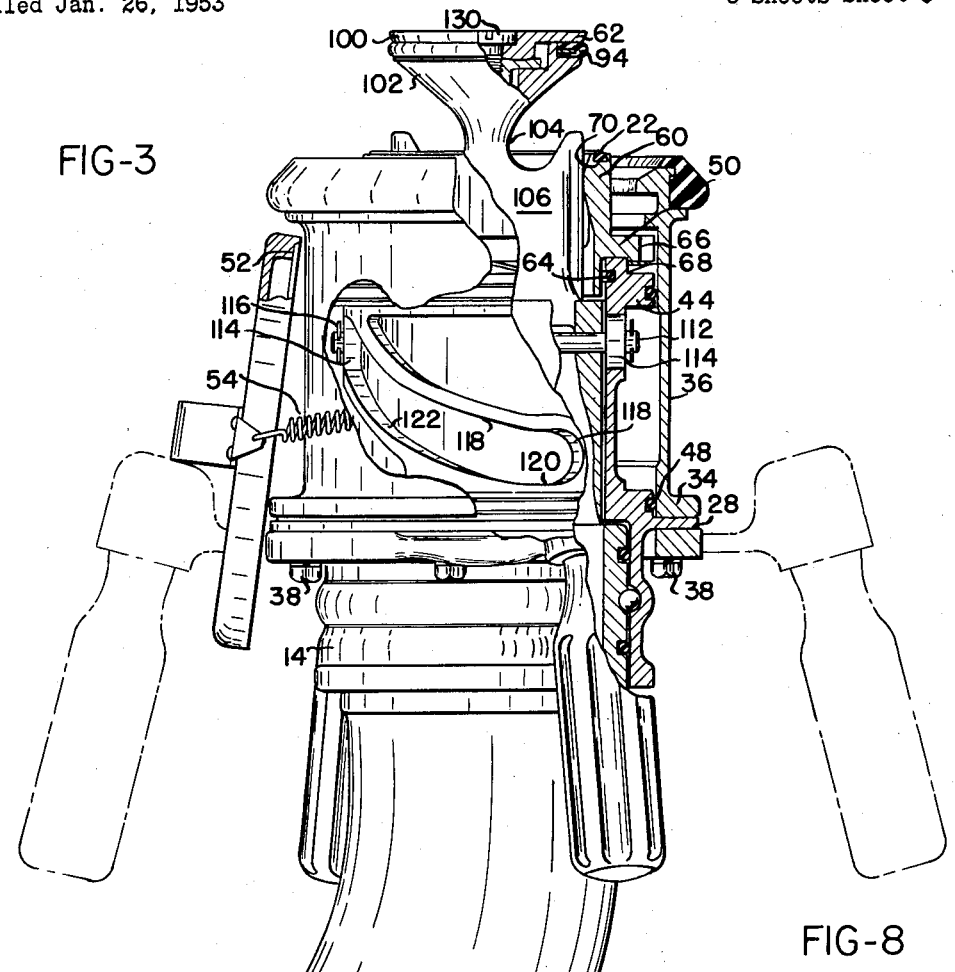
Figure 3 is a view like Figure 1 but showing the valve member of the nozzle in open position and with a portion of the outer casing of the nozzle broken away to show the cam track along which rollers ride in moving the valve member to its open position.

Referring to the drawings somewhat more in detail, the fuel nozzle of this invention, as will best be seen in Figures 1 and 3, comprises an elbow 10 of relatively long radius, the lower end of which at 12 is adapted for connection with a flexible supply line leading to a source of fuel or other liquid to be dispensed.

The upper end of elbow 10 is telescopically received within the dependent skirt portion 14 of member 16 forming the inner part of the body of the fuel nozzle. Spaced O rings 18 mounted in annular grooves in one of skirt 14 and elbow 10 and bearing on the other thereof provide means for effecting a fluid-tight but rotatable engagement of the said skirt and elbow. The skirt and elbow are also provided with registering groove means 20 in which are disposed a plurality of balls 22 introduced into the grooves through the threaded bore 24 closed by a threaded element 26 forming also a part of the ground cable assembly 25, and the balls 22 operate positively to retain the elbow and skirt in engagement while permitting free rotation therebetween.

Member 16, at the upper end of skirt 14, has a radial flange 28, as best seen in Figures 1, 3 and 4, the bottom surface of which is abutted by a ring 30 having lateral projections to which are attached handles 32.

The upper surface of flange 28 is abutted by a flange 34 on the lower end of an outer body part 36 of the upper end of the fuel nozzle.

As will best be seen in Figure 4, the flange 28, the ring 30, and the flange 34 are adapted for receiving a plurality of clamping screws 38, and the relative positions angularly of the flanges and the ring are determined by a dowel pin 40 closely fitting within the bores 42 provided therefor in the flanges and ring.

Member 16, as will be seen in Figures 1, 2, 3 and 4, extends upwardly inside outer part 36 and has a radial flange 44 adjacent its upper end, the outer periphery of which is grooved for receiving a resilient O ring 46 that effects fluid-tight engagement with the inner surface of outer part 36 of the nozzle. The lower end of member 16 immediately above flange 28 is provided with a similar O ring 48 that also effects a seal with the inner surface of outer part 36. It will be noted, particularly in Figures 1, 3 and 4, that the said outer part 36 is formed so that only a limited length thereof at its opposite ends needs to be machined to form a surface suitable for sealing engagement between O rings 46 and 48.

The uppermost end of the outer body part 36 of the nozzle is provided with a rubber-like sealing ring 50 adapted for sealing engagement by a cover member 52 resiliently held in place by the springs 54.

Figure 7:
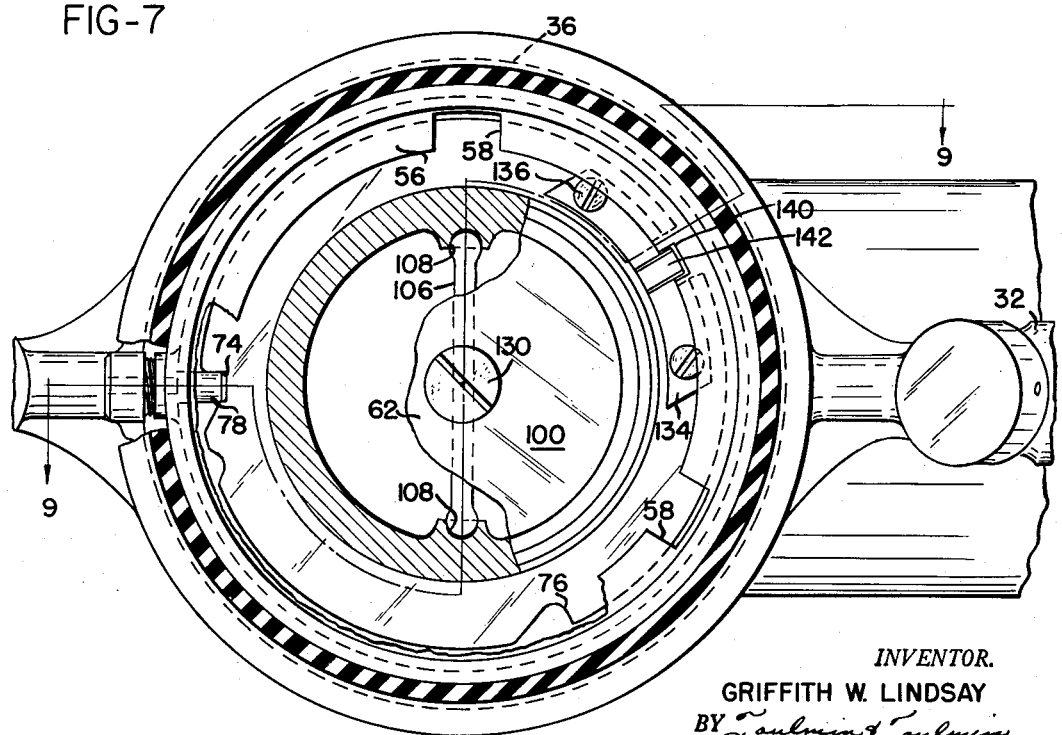
Figure 7 is a plan view partly in section indicated by line 7—7 on Figure 1.

Extending inwardly about the upper open end of outer body part 36 is a flange 56 which is provided with circumferentially spaced notches 58, as will best be seen in Figure 7. These notches are for the purpose of receiving lugs on an adapter member to which the nozzle is to be attached, as will be explained more fully hereinafter.

The actual valving of fluid flow from the nozzle is accomplished by the combination of a valve sleeve 60 in the upper end of the nozzle and a valve member 62 adapted for closing the valve sleeve 60. These members are best seen in Figures 1, 2, 3 and 4 and in enlarged detail in Figures 10 and 11.

Figure 6:
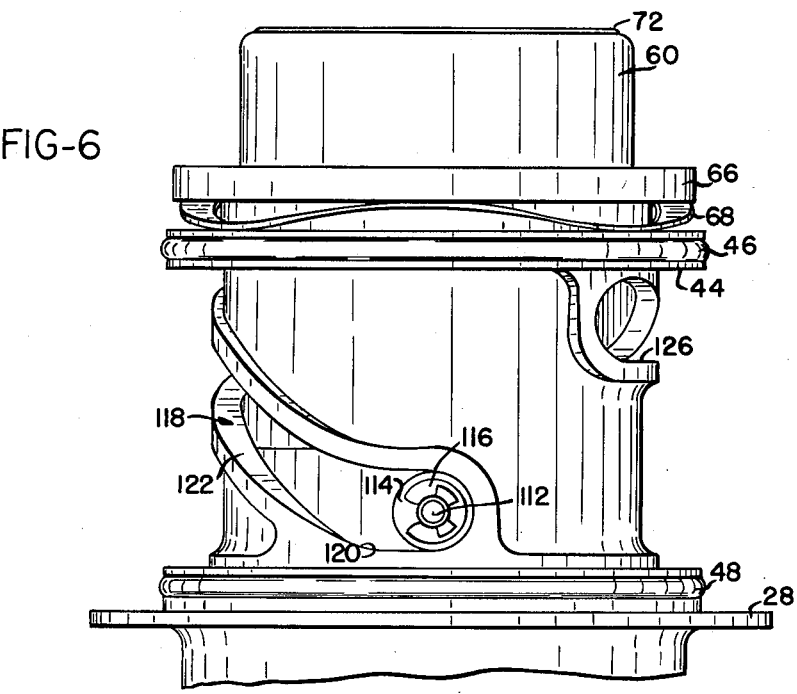
Figure 6 is a view showing the cam track within the nozzle provided for opening the valve member thereof.

The sleeve 60 is of a generally cylindrical nature and, at its lower end, telescopically engages the upper end of member 16 and sealed thereto by a resilient annular O ring 64. Immediately above the upper end of member 16 valve sleeve 60 has a radial flange 66, and between the bottom of radial flange 66 on sleeve member 60 and the top of the radial flange 44 on the upper end of member 16 is an undulating resilient wave washer 68. The wave washer and its relationship to the flanges 44 and 66 is clearly illustrated in Figure 6, and the purpose of this element is to provide for axial movement of valve sleeve 60 relative to member 16 during the connecting of the nozzle with an adapter so that the proper seal can be maintained between the nozzle and the adapter. This arrangement provides for a self-adjusting nose seal between the nozzle and adapter which is much more effective than the side seals previously employed.

The seal between the nozzle and the adapter is provided for by a resilient annular member carrier on the upper end of valve sleeve 60 which is shown in some detail in Figure 10. It will be noted that the upper end of sleeve 60 is provided with a dovetail groove 70 in which is disposed a resilient sealing ring 72 that projects upwardly above the upper surface of valve sleeve 60.

Figure 8:
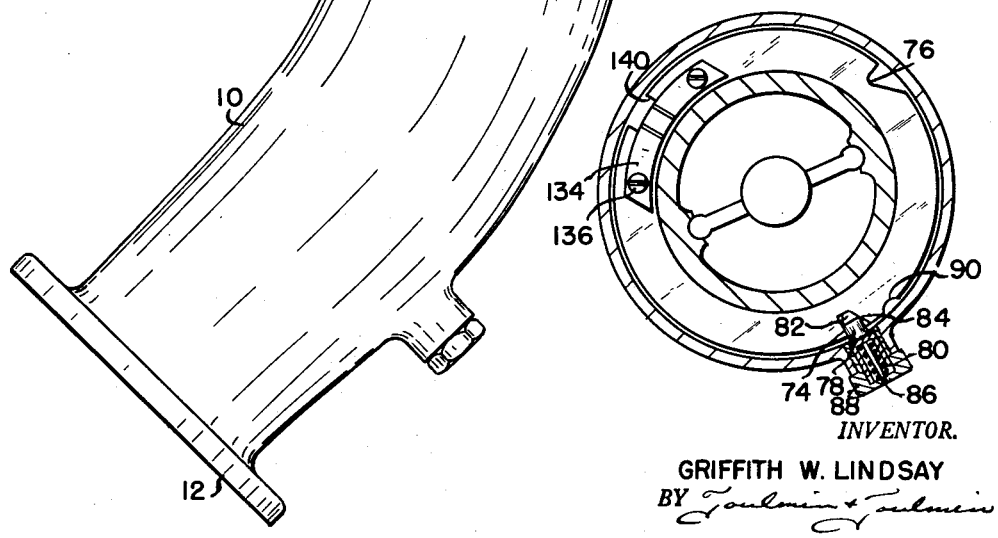
Figure 8 is a sectional view indicated by line 8—8 on Figure 2 showing indicators and locking plunger for the fuel nozzle and the cam associated therewith.

The outer periphery of flange 66 on valve sleeve 60 is formed, as will be seen in Figures 4, 7 and 8, with a pair of angularly spaced stop notches 74 and 76 that are adapted for positive engagement with a plunger or detent means 78 located in a bore in the outer body part 36 and spring urged inwardly toward the cam surface by the spring 80.

The stop notches provide for limited relative rotary movement between the outer body part 36 of the fuel nozzle and the parts connected therewith and the valve sleeve 60. The plunger 78 preferably has a 60 degree taper on the inner end at 82, and the notch 74 in which the plunger is disposed when the valve is closed has a short 60 degree surface 84 on one side thereof so that, while the plunger effects a substantially positive locking together of the valve sleeve and the outer valve part thus preventing accidental opening of the valve in the disconnecting position, the application of a reasonable amount of torque to the outer body part when the valve sleeve is held stationary is sufficient to permit relative movement therebetween.

An indicator plunger 86 on plunger 78 is normally disposed completely within cap 88 when the valve is either opened or closed, but for any intermediate position of the valve the plunger 86 will extend beyond cap 88 thereby giving an immediate indication that the valve is not fully closed.

An auxiliary notch 90 is provided which will serve as a lock for locking the valve in a closed position with the nozzle attached to the adapter.

Turning now to the valve member 62, this member is adapted for effecting a seal about the upper end of valve sleeve 60, and for this purpose it is constructed in the manner illustrated in Figure 11. In Figure 11 it will be observed that the upper end of valve sleeve 60 is provided with a chamfer 92 forming a valve seat that is engaged by the annular member 94 mounted on a ring 96 and disposed in a notch 98 formed between an upper plate member 100 and a stem part 102 of the valve member.

Now turning to Figures 1, 2, 3 and 4, it will be seen that the stem part 102 of the valve member consists of an uppermost outwardly flaring portion that is joined by a reduced diameter neck 104 with a substantially flat rib-like center part 106. The rib-like center part 106 has its side edges arcuately formed and slidably fitting within arcuate grooves located at diametrically opposite points inside valve sleeve 60, as will be seen at 108 in Figure 7. This engagement of the rib-like center portion of the valve member with the valve sleeve prevents relative rotation therebetween while permitting axial movement of the valve member in the sleeve.

The extreme lower end of center rib-like portion 106 of the valve member connects with the lowermost cylindrical part 110 of the valve member which extends downwardly through the inner body part 16 of the nozzle and into the upper end of elbow 10. Cylinder portion 110 generally tapers inwardly to provide for a minimum turbulence in the fluid passing therethrough.

Extending transversely through cylindrical part 110 immediately below center rib portion 106 of the valve member and to its co-planer therewith is a shaft 112 which extends outwardly beyond said cylindrical portion 110 and carries rollers 114 retained in position by the snap rings 116.

Referring now to Figures 1, 3, 6, 7 and 9, it will be observed that the rollers 114 on the opposite ends of shaft 112 are received within grooves or cam tracks 118 provided in inner body part 16 of the nozzle. These cam tracks or grooves 118, as will best be seen in Figure 9, comprise a lower flat portion 120, a first inclined portion 122, a second and steeper inclined portion 124, and the terminal flat portion 126, with both of the flat portions having closed ends.

As will hereinafter be seen, the first inclined portion 122 is provided so that the initial latching together of the fuel nozzle and adapter and the initial opening of the fuel nozzle valve and adapter valve can be accomplished relatively easily while the steeper portion 124 is provided so that the latter portion of the opening movement of the valves can be accomplished rapidly. The terminal flat portion 126 is provided so that the valves will stay open until manually closed.

Returning to Figure 1, the part 100 of valve member 62 is retained on the stem part by a screw 130 which threads into the stem part, and a lock nut 132 is provided through which the screw extends and which lock nut is provided with tabs at its opposite sides that extend into notches provided therefor so that the portion 100 of the valve member will be securely locked in position by putting screw member 130 in position.

Figure 2:
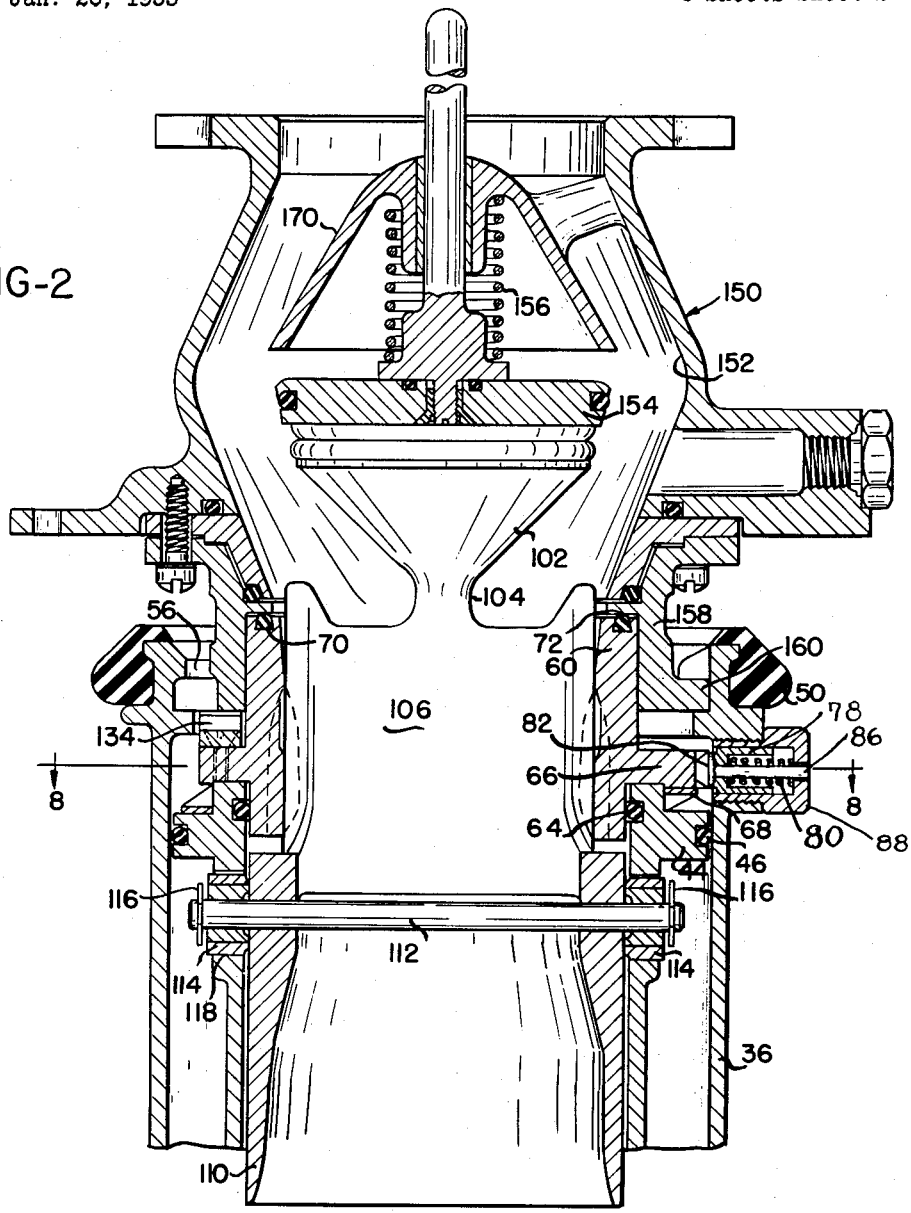
Figure 2 is a view similar to Figure 1 but showing only the upper portion of the fuel nozzle attached to a typical adapter fitting, drawn at increased scale.

Referring to Figures 1, 2 and 5, the radial flange 66 of the valve sleeve 60 has mounted thereon an element 134 by screws 136, the said element comprising a depending lock 138 extending into a notch 140 and flange 66, and an upstanding lug 142.

Referring now specifically to Figures 2 and 7, the nozzle of this invention is adapted for use in connection with an adapter generally identified at 150 in Figure 2. This adapter comprises a body having a flow passage 152 therein adapted for being closed by a valve member 154 spring urged by a spring 156 toward a lower closed position.

The lowermost portion of adapter 150 is adapted for being mounted in any suitable stationary location as, for example, in the side of the fuselage or in the top or bottom surface of the wing of an aircraft, and is connected with the tank to be filled.

The lowermost portion of adapter 150, which is exposed for connection with the nozzle, consists of a sleeve 158 having locks 160 for entering the notches 58 provided in flange 56 in the upper end of outer body part 36 of the nozzle.

The adapter 150 is also provided with a notch for receiving the upstanding lug 142 of element 134 that is connected with flange 66 of valve sleeve 60.

The adapter 150 is more fully shown and described in my application, Serial Number 333,042, filed January 26, 1953.

It will be evident at this point that when the fuel nozzle is brought into engagement with the adapter 150 so that the upstanding lug 152 is engaged with the notch provided therefor in sleeve 158 of the adapter and with the lugs 160 on the sleeve 158 of the adapter in the position which they occupy in Figure 2, then rotation of the body of the fuel nozzle will bring about opening of the valves thereof because the valve sleeve 60 and the valve member 62 will be held against rotation by their engagement with each other and the engagement of the valve sleeve with the adapter while rotation of the body part of the nozzle will cause the grooves or cam tracks 118 to force the valve member 62 vertically upwardly.

The upward movement of valve member 62 will cause it first to engage valve member 154 and then to open the valve member so that in their terminal positions the valve members 62 and 154 will be as they are shown in Figure 2.

The initial rotation movement of the body part of the nozzle will move the lugs 160 out of alignment with the notches 58 so that there is no chance for the nozzle to become disengaged from the adapter until the valve body is rotated in the opposite direction.

It will be observed that the nozzle and adapter provide a flow passage that offers a minimum amount of resistance to fluid flow because of the substantially uniform and unobstructed nature of the passage. The provision of the central element 170 in the adapter prevents any turbulence from being set up behind the valve member of the adapter due to its streamline shape and also serves as a support for the valve member.

The stop plunger on the nozzle, and the closed cam tracks, prevent over-travel of the body of the nozzle during opening thereof and thus there is no chance of the nozzle being turned so far that it disengages from the adapter when the valve in the nozzle is open.

When the nozzle is removed from the adapter the initial flat portion of the cam tracks in the inner body part 16, in addition to the engagement of the stop plunger on the nozzle, serve to hold the valve member of the nozzle positively closed thereby preventing loss of fuel from the nozzle.

Preferably, the body of the nozzle and the body of the adapter are provided with indicator spots identified by paint or enamel that will guide the operator in connecting the nozzle to the adapter.

The fuel nozzle, according to my invention, and the combination thereof with an adapter of the nature shown thus offers the advantages of ease of connection, positive and automatic opening and closing of the valve member, prevention of accidental opening of the valve member or disconnection of the nozzle from the adapter while the valve member is open, ease of disassembly and assembly of the nozzle, and a standardized unit.

It will be understood that this invention is susceptible to modification in order to adapt it to different usages and conditions, and, accordingly, it is desired to comprehend such modifications within this invention as may fall within the scope of the appended claims.

I claim:

1. In a nozzle of the nature described, the body part adapted to lockingly engage an adaptor and having a discharge end, the said body part having a substantially straight flow passage therethrough, a cylindrical valve sleeve sealingly rotatably mounted in said discharge end, a valve member reciprocably mounted in said sleeve, said valve member closing the discharge end of said sleeve and adapted to move outwardly therefrom to an open position, means for cooperation with means on said adaptor to detachably lock said sleeve against rotation, means responsive to relative rotation between said sleeve and body part for reciprocating said body member in the sleeve, and detent means cooperating with said sleeve member and operable by rotating said body part for locking said valve sleeve and body part, and means on said sleeve for unlocking said detent means upon rotation of said body part in the opposite direction.

2. In a nozzle of the nature described, a body part adapted to lockingly engage an adapter and having a flow passage therethrough, a cylindrical valve sleeve sealingly rotatably mounted in the discharge end of said body part, a valve member reciprocably mounted in said sleeve for movement between open and closed positions, means for cooperation with means on said adapter to detachably lock said sleeve against rotation, a generally spiral cam track in said body part, a cam follower on the valve member engaging the track whereby relative rotation between the sleeve and body part will cause reciprocation of the valve member in the sleeve between open and closed positions, spaced notches having cam surfaces in the periphery of said sleeve, said notches positioned at the open and closed positions of said valve member which correspond to the locked and unlocked positions of said body part and adapter, a spring loaded plunger in the body part bearing on the periphery of said sleeve for engagement with said notches to limit said relative rotation between said locked and unlocked positions, rotation of said body part causing engagement of said plunger with one of said notches to lock said valve member in either said open or closed position and rotation of said body part in the opposite direction disengaging said plunger, and means on said plunger for visibly indicating the disengagement of said plunger with said spaced notches.

3. In a nozzle of the nature described, as claimed in claim 2, with said last-mentioned means comprising an indicating extension that projects outwardly from the body part to indicate the disengagement of said plunger with said spaced notches.

References Cited in the file of this patent

UNITED STATES PATENTS

| | | |
|---|---|---|
| 560,815 | Noyes | May 26, 1896 |
| 910,579 | Roth | Jan. 26, 1909 |
| 1,343,084 | Kessler | June 8, 1920 |
| 1,971,132 | Crowley | Aug. 21, 1934 |
| 2,048,936 | Kremser | July 28, 1936 |
| 2,295,821 | Wyss | Sept. 15, 1942 |
| 2,311,239 | Main et al. | Feb. 16, 1943 |
| 2,519,358 | Davies | Aug. 22, 1950 |
| 2,543,590 | Swank | Feb. 27, 1951 |
| 2,665,926 | Fraser | Jan. 12, 1954 |

FOREIGN PATENTS

| | | |
|---|---|---|
| 854,220 | France | Jan. 4, 1940 |
| 859,331 | France | June 3, 1940 |
| 876,521 | France | Nov. 9, 1942 |